United States Patent
Yu et al.

(10) Patent No.: US 11,004,443 B2
(45) Date of Patent: May 11, 2021

(54) MULTISTAGE CURRICULUM TRAINING FRAMEWORK FOR ACOUSTIC-TO-WORD SPEECH RECOGNITION

(71) Applicant: TENCENT AMERICA LLC, Palo Alto, CA (US)

(72) Inventors: Chengzhu Yu, Bellevue, WA (US); Chao Weng, Fremont, CA (US); Jia Cui, Bellevue, WA (US); Dong Yu, Bothell, WA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 191 days.

(21) Appl. No.: 16/117,373

(22) Filed: Aug. 30, 2018

(65) Prior Publication Data
US 2020/0074983 A1    Mar. 5, 2020

(51) Int. Cl.
| G10L 15/187 | (2013.01) |
| G10L 15/06 | (2013.01) |
| G10L 15/16 | (2006.01) |

(52) U.S. Cl.
CPC ............ G10L 15/063 (2013.01); G10L 15/16 (2013.01)

(58) Field of Classification Search
CPC .............................. G10L 15/16; G10L 15/063
See application file for complete search history.

(56) References Cited

U.S. PATENT DOCUMENTS

| 9,514,391 | B2 | 12/2016 | Perronnin et al. | |
| 9,728,185 | B2 | 8/2017 | Schalkwyk et al. | |
| 9,786,270 | B2 | 10/2017 | Senior et al. | |
| 10,706,840 | B2* | 7/2020 | Sak | G06N 3/02 |
| 2015/0032449 | A1 | 1/2015 | Sainath et al. | |
| 2016/0171974 | A1 | 6/2016 | Hannun et al. | |
| 2016/0351188 | A1* | 12/2016 | Rao | G06N 3/084 |
| 2017/0140753 | A1* | 5/2017 | Jaitly | G10L 15/16 |
| 2018/0053500 | A1* | 2/2018 | Sak | G10L 15/02 |
| 2018/0174576 | A1* | 6/2018 | Soltau | G06N 3/084 |
| 2019/0096390 | A1* | 3/2019 | Kurata | G10L 15/22 |
| 2019/0318725 | A1* | 10/2019 | Le Roux | G10L 15/22 |

OTHER PUBLICATIONS

Written Opinion of the International Searching Authority issued in International Application No. PCT/US19/38443; dated Sep. 9, 2019.
International Search Report issued in International Application No. PCT/US19/38443. dated Sep. 9, 2019.
(Continued)

*Primary Examiner* — Jakieda R Jackson
(74) *Attorney, Agent, or Firm* — Sughrue Mion, PLLC

(57) ABSTRACT

Methods and apparatuses are provided for performing acoustic to word (A2W) speech recognition training performed by at least one processor. The method includes initializing, by the at least one processor, one or more first layers of a neural network with phone based Connectionist Temporal Classification (CTC), initializing, by the at least one processor, one or more second layers of the neural network with grapheme based CTC, acquiring, by the at least one processor, training data and performing, by the at least one processor, A2W speech recognition training based the initialized one or more first layers and one or more second layers of the neural network using the training data.

18 Claims, 6 Drawing Sheets

(56) References Cited

OTHER PUBLICATIONS

Hagen Soltau et al., "Neural Speech Recognizer: Acoustic-to-Word LSTM Model for Large Vocabulary Speech Recognition," ArXiv e-prints, Oct. 2016, pp. 1-6.

Kartik Audhkhasi et al., "Building competitive direct acoustics-to-word models for English conversational speech recognition", ArXiv e-prints, Dec. 2017, pp. 1-5.

* cited by examiner

MULTISTAGE CURRICULUM TRAINING FRAMEWORK FOR ACOUSTIC-TO-WORD SPEECH RECOGNITION

BACKGROUND

1. Field

The present disclosure relates to methods and apparatuses for performing direct acoustic-to-word (A2W) speech recognition, particularly, multistage curriculum training for A2W speech recognition.

2. Description of the Related Art

Related art speech recognition systems rely primarily on modeling sub-word units, except for some isolated word speech recognition tasks, to perform automatic speech recognition to recognize spoken words. This reliance on modeling sub-word units is mostly due to the difficulty of directly using words as acoustic modeling unit. The challenge of using words as acoustic modeling unit comes from (1) the sparsity of training data, and (2) capturing long term dependencies between acoustic frames. With the recent success in applying recurrent neural network (RNN) and its variants in speech recognition, modeling long term dependencies of acoustic frames for word prediction has become feasible. In a recent study, the authors of the Non-Patent Literature (NPL) document 1 propose a direct acoustic-to-word (A2W) system that achieves speech recognition performance by leveraging 125,000 hours of training data collected from Youtube videos with captions. This speech recognition system is composed of a single neural network trained in end-to-end fashion without any language model and complex decoder.

Accordingly, direct A2W all-neural speech recognition is a new speech recognition framework where speech recognition can be performed in a truly end-to-end fashion without using language models, decoding processes, and complicated lattice searching. However, due to the problem of data sparsity and the difficulty of directly predicting a whole word, related art A2W system currently achieve competitive results only on scenarios with extraordinary large dataset (i.e., 125,000 hours of data). Since such large amount of transcribed speech data is very rare, related art A2W speech recognition techniques are not practical in real applications. Moreover, the data sparsity problem of A2W system arises as certain words in the vocabulary does not occur very frequently in the training data. However, as many words share the same structural representation, the data sparsity problem can be alternatively alleviated by exploiting these shared representations. Another recent study in NPL document 2 is an example where A2W system achieves competitive speech recognition performance with a moderately sized training data by initializing the A2W system with Connectionist Temporal Classification phone (CTC-phone) model. That is, the model initialization and regularizations are very important for A2W system when the training data is not exceptionally large.

NPL Documents

NPL document 1: H. Soltau, H. Liao, and H. Sak, "Neural Speech Recognizer: Acoustic-to-Word LSTM Model for Large Vocabulary Speech Recognition," ArXiv e-prints, October 2016.

NPL document 2: K. Audhkhasi, B. Kingsbury, B. Ramabhadran, G. Saon, and M. Picheny, "Building competitive direct acoustics-to-word models for English conversational speech recognition," ArXiv e-prints, December 2017.

SUMMARY

Provided are methods and apparatuses that improve the related art A2W speech recognition system by implementing a multi-stage curriculum training technique which may address the data sparsity problem by exploiting inherent resemblance between different words in the vocabulary and may achieve state-of-the-art results in scenarios with moderately sized training dataset.

According to an aspect of the present disclosure, the multi-stage curriculum training may include hierarchical phoneme-grapheme pre-training, curriculum training with increasing vocabulary order, and a joint CTC-CE training which significantly improve the A2W all-neural speech recognition system performance in moderate and large vocabulary speech recognition task.

According to an aspect of the present disclosure, there is provided a method of performing acoustic to word (A2W) speech recognition training performed by at least one processor, the method comprising: initializing, by the at least one processor, one or more first layers of a neural network with phone based Connectionist Temporal Classification (CTC); initializing, by the at least one processor, one or more second layers of the neural network with grapheme based CTC; acquiring, by the at least one processor, training data; and performing, by the at least one processor, A2W speech recognition training based the initialized one or more first layers and one or more second layers of the neural network using the training data.

The one or more first layers of the neural network maybe lower layers of the neural network that are closer to an input of the training data.

The one or more second layers of the neural network maybe stacked above one or more first layers of the neural network.

The one or more first layers of the neural network may comprise at least one of the CNN layer and the BLTSM layer.

The initializing of the one or more second layers of the neural network maybe performed after the initializing of the one or more first layers of the neural network.

The performing the A2W speech recognition training may comprise: generating a first training model by performing a first training stage by predicting only a first set of target words; and generating a second training model by performing a second training stage by predicting a second set of target words based on the first training model.

All utterances in the training data of words not belonging to the first set of target words maybe excluded from the first training stage.

The one or more second layers may comprise a first linear projection layer, and the performing the A2W speech recognition training may comprise: projecting an output of the first linear projection layer with a second linear projection layer and a third linear projection layer.

Output from the second linear layer maybe directly connected to a final output layer of a CE model to receive error signals from CE loss, and Both the output from the second linear layer and output from the third linear layer maybe concatenated to obtain a final output distribution for computing CTC loss.

According to another aspect of the present disclosure, there is provided an acoustic to word (A2W) speech recognition training apparatus comprising: at least one memory operable to store program code; and at least one processor operable to read said program code and operate as instructed by said program code, said program code comprising: a first initialization code configured to initialize one or more first layers of a neural network with phone based Connectionist Temporal Classification (CTC); a second initialization code configured to initialize one or more second layers of the neural network with grapheme based CTC; an acquiring code configured to acquire training data; and a training code configured to perform A2W speech recognition training based the initialized one or more first layers and one or more second layers of the neural network using the training data.

The one or more first layers of the neural network maybe lower layers of the neural network that are closer to an input of the training data.

The one or more second layers of the neural network maybe stacked above one or more first layers of the neural network.

The one or more first layers of the neural network may comprise at least one of the CNN layer and the BLTSM layer.

The initializing of the one or more second layers of the neural network maybe performed after the initializing of the one or more first layers of the neural network.

The performing the A2W speech recognition training may comprise: generating a first training model by performing a first training stage by predicting only a first set of target words; and generating a second training model by performing a second training stage by predicting a second set of target words based on the first training model.

All utterances in the training data of words not belonging to the first set of target words maybe excluded from the first training stage.

The one or more second layers may comprise a first linear projection layer, and the performing the A2W speech recognition training may comprise: projecting an output of the first linear projection layer with a second linear projection layer and a third linear projection layer.

Output from the second linear layer maybe directly connected to a final output layer of a CE model to receive error signals from CE loss, and both the output from the second linear layer and output from the third linear layer maybe concatenated to obtain a final output distribution for computing CTC loss.

According to another aspect of the present disclosure, there is provided a non-transitory computer readable medium having stored thereon program code for performing an acoustic to word (A2W) speech recognition training, said program code comprising: a first initialization code configured to initialize one or more first layers of a neural network with phone based Connectionist Temporal Classification (CTC); a second initialization code configured to initialize one or more second layers of the neural network with grapheme based CTC; an acquiring code configured to acquire training data; and a training code configured to perform A2W speech recognition training based the initialized one or more first layers and one or more second layers of the neural network using the training data.

The training code to perform A2W speech recognition training may further comprise: a first generating code configured to generate a first training model by performing a first training stage by predicting only a first set of target words; and a first generating code configured to generate a second training model by performing a second training stage by predicting a second set of target words based on the first training model.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
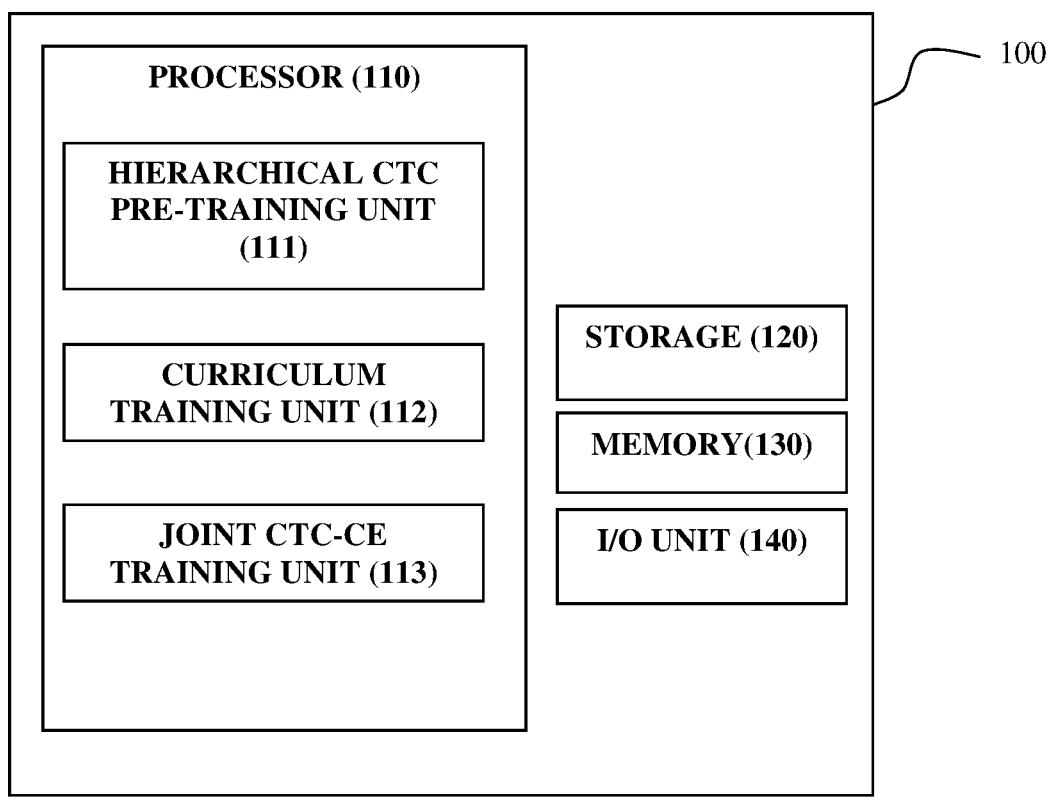
FIG. 1 is an apparatus implementing a multistage curriculum technique for acoustic to word (A2W) speech recognition training according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, acoustic to word (A2W) processing methods and apparatuses according to embodiments will be described in detail with reference to the accompanying drawings. The term such as "comprise" or "include" used herein should not be construed as necessarily including all of the elements or operations (or steps) described herein, and should be construed as not including some of the described elements or operations (or steps) or as further including additional elements or operations (or steps).

Although terms such as "first" and "second" may be used herein to describe various elements or components, the elements or components should not be limited by the terms. These terms are only used to distinguish one element or component from another element or component.

One or more embodiments of the present disclosure may address the multi-talker speech recognition, which recognize the multi-talker mixed overlap speech, in the scenario, such as cocktail party environment or other group environment.

FIG. 1 is a block diagram illustrating an acoustic to word (A2W) speech recognition system with multistage curriculum training technique according to an embodiment. The A2W speech recognition system 100 may include a processor 110, storage 120, memory 130 and I/O unit 140. According to an embodiment, the processor 110 may include hierarchical CTC pre-training unit 111, curriculum training unit 112, and joint CTC-CE training unit 113.

Compared to related art A2W speech recognition systems, the A2W speech recognition system 100 may resolve the data sparsity problem of training A2W speech recognition system without relying on extraordinary large transcribed training. The A2W speech recognition system 100 can achieve improvement over the related art without using language model, decoding, and complicated searching algorithm in regular sized large vocabulary speech recognition tasks. Therefore, one or more aspects of the A2W speech recognition system 100 can be widely applied to speedup the speech recognition system during inference. Moreover, one or more aspects of the A2W speech recognition system 100 can also be deployed in on-device speech recognition scenarios with limited memory as it does not require separate language model to achieve very competitive speech recognition performances.

According to an embodiment, one or more of the hierarchical CTC pre-training unit 111, the curriculum training unit 112, and the joint CTC-CE training unit 113 provide the multistage curriculum training mechanism.

Figure 2:
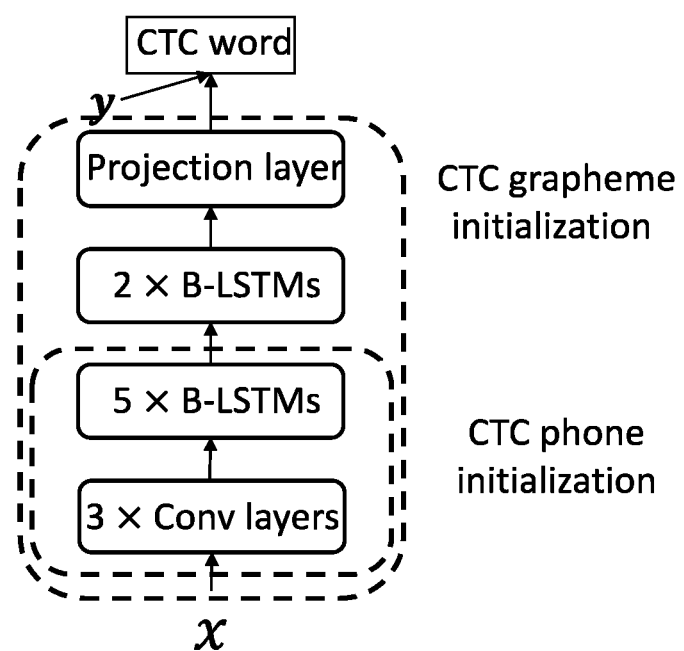
FIG. 2 is a diagram illustrating hierarchical CTC pre-training according to an embodiment.

FIG. 2 illustrates the hierarchical CTC pre-training unit 111 according to an embodiment. When the training data is moderately sized, model initialization with CTC-phone has been beneficial and important in A2W systems. For instance, by pre-training the A2W model with CTC-phone, the underlying shared representation of words can be learned in advance. According to an embodiment, the hierarchical CTC pre-training performed by the hierarchical CTC pre-training unit 111 includes CTC phone initialization process of initializing one or more first layers of a neural network with phone based CTC and a CTC grapheme initialization process or initializing one or more second layers of the neural network with grapheme based CTC. Thereafter, A2W speech recognition training is performed based on the initialized one or more first layers and one or more second layers of the neural network using the training data X to generate CTC word output Y.

According to an embodiment illustrated in FIG. 2, lower layers of a neural network may be initialized with phone based CTC initialization and upper layers of the neural network may be initialized with CTC grapheme initialization. According to an embodiment, the lower layers may include three CNN layers and five BLSTM layers which may be initialized with phone based CTC. According to an embodiment, the three CNN layers and the five BLSTM layers are provided at the bottom of the neural network. According to another embodiment, the lower layers may include different numbers of CNN layers and BLSTM layers provided at the bottom of the neural network.

Further, the upper layer may include additional layers, which are stacked on top of the lower layers, and may be initialized with CTC grapheme initialization. For instance, the upper layer may include two additional BLSTM layers, which are stacked on top of five bottom BLSTM layers, and may be initialized with CTC grapheme initialization. According to another embodiment, the upper layers may include different numbers of BLSTM layers provided on top of the lower layers.

Figure 3:
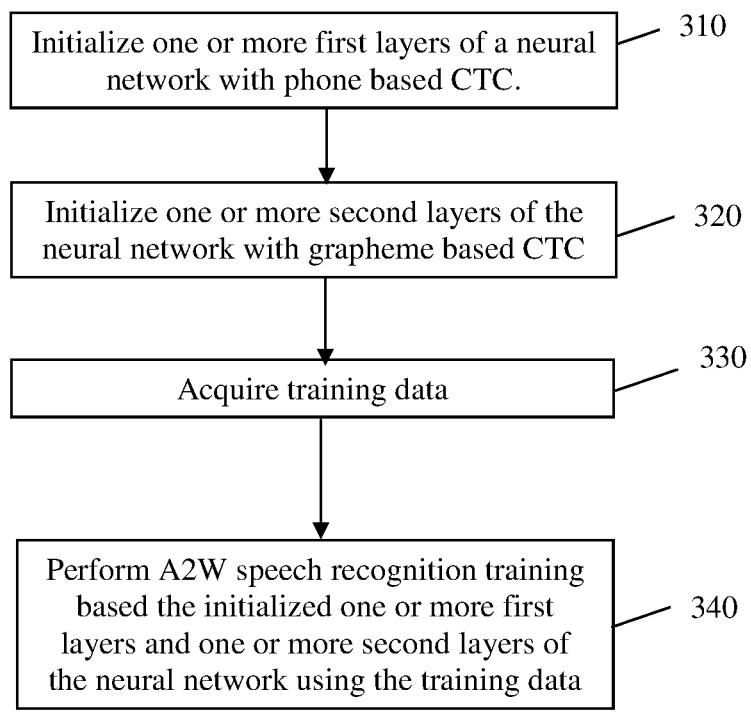
FIG. 3 is a flowchart illustrating operations of hierarchical CTC pre-training according to an embodiment.

FIG. 3 is a flowchart illustrating operations of the hierarchical CTC pre-training unit 111 according to an embodiment.

At 310, a processor may initialize one or more first layers of a neural network with phone based CTC. The one or more first layers may be lower layers of a neural network. According to an embodiment, the lower layers may include three CNN layers and five BLSTM layers which may be initialized with phone based CTC. According to an embodiment, the three CNN layers and the five BLSTM layers are provided at the bottom of the neural network. According to another embodiment, the lower layers may include different numbers of CNN layers and BLSTM layers provided at the bottom of the neural network.

At 320, the processor may initialize one or more second layers of the neural network with grapheme based CTC. The one or more second layers may be upper layers of the neural network initialized with CTC grapheme initialization. According to an embodiment, the upper layer may include additional layers, which are stacked on top of the lower layers, and may be initialized with CTC grapheme initialization. For instance, the upper layer may include two additional BLSTM layers, which are stacked on top of five bottom BLSTM layers, and may be initialized with CTC grapheme initialization. According to another embodiment, the upper layers may include different numbers of BLSTM layers provided on top of the lower layers.

At 330, the processor may acquire training data.

At 340, the processor may perform A2W speech recognition training based the initialized one or more first layers and one or more second layers of the neural network using the training data.

According to an embodiment, the hierarchical CTC pre-training is performed sequentially. For instance, the hierarchical CTC pre-training unit 111 may first initialize the bottom three CNN and five BLSTM layers with phone based CTC. Thereafter, the hierarchical CTC pre-training unit 111 may initialize the two additional BLSTM layers are stacked on top of five BLSTM layers. Here, instead of randomly initializing the top two BLSTM directly for A2W system, the hierarchical CTC pre-training unit 111 pre-trains the top two BLSTM layers with CTC criterion with grapheme as targets. Accordingly, by using grapheme as target, the hierarchical CTC pre-training unit exploits additional structural representations coming from grapheme learning.

According to an embodiment, the hierarchical CTC pre-training improves on the generalization of the A2W systems by utilizing the additional structural representations coming from both phoneme and grapheme learning. For instance, by pre-training the neural network with both phones and graphemes at different network depths, the network can learn different structural patterns at different network depth that will be finally utilized for A2W system. During the pre-training stage, when the target is phoneme, the neural network learns the structural patterns that are useful to predict phoneme. Similarly, when the target is grapheme, the network learns the structural patterns that are useful to predict grapheme representation of the speech.

Accordingly, the hierarchical CTC pre-training achieves improvements in the A2W systems based on the additional structural representations coming from both phoneme and grapheme learning. That is, instead of randomly initializing the top two BLSTM directly for A2W system, the hierarchical CTC pre-training unit 113 further pre-trains the top two BLSTM layers with CTC criterion with grapheme as targets. As a result of using grapheme as target, additional structural representations coming from grapheme learning can be utilized for training.

Next, operations of the curriculum training unit 112 are described herein according to an embodiment. For instance, when training A2W system, rare words in the training data are much difficult to train than the frequently occurring words. As such, modelling all the words in training data simultaneously can result in suboptimal performance when the training data is not large enough. The curriculum training unit 112 may address this problem by starting the training by first learning easier subtasks. That is, the curriculum training unit 112 performs the training by gradually increasing target vocabulary size for A2W system.

Specifically, according to an embodiment, the training is performed in an order of increasing vocabulary size from 10,000 to 20,000 words. First, the training A2W model predicts only the most frequently occurring 10,000 words in a first curriculum training stage. During the first stage of the curriculum training with 10,000 vocabulary, all utterances with words not belonging to the selected 10,000 vocabulary are excluded from training. Therefore, in the first stage of curriculum training, <unk> label does not exist. After the training of A2W model with 10,000 vocabulary converges, the model is then used as starting point to continuously learning to predict vocabulary of larger size (20 k) with the rest of words mapped to <unk> label in a second stage of curriculum training. Accordingly, the curriculum training unit 112 first ensures a good convergence point for predicting more frequently occurring words, and the learned representation from the earlier stage could also help predicting the words with fewer examples.

Figure 4:
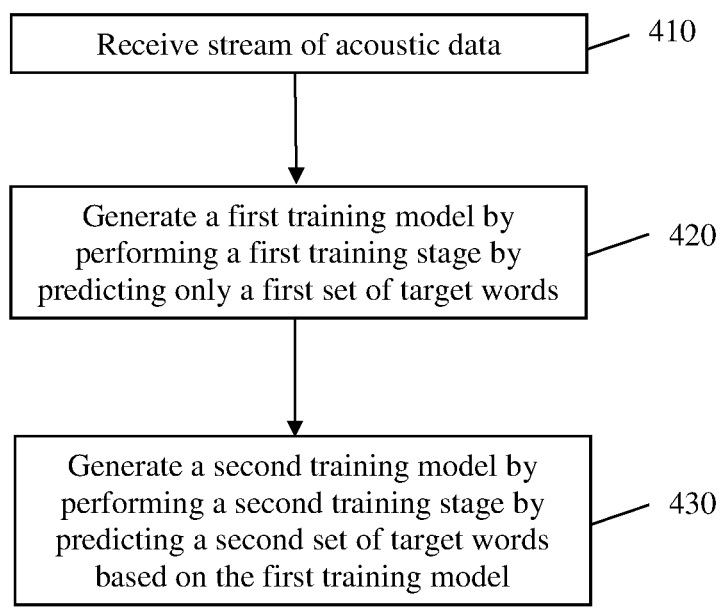
FIG. 4 is a flowchart illustrating operations of curriculum training according to an embodiment.

FIG. 4 is a flowchart illustrating operations of the curriculum training unit 112 according to an embodiment.

At 410, a processor may receive a stream of acoustic data to perform A2W speech recognition training.

At 420, the processor may generate a first training model by performing a first training stage by predicting only a first set of target words. According to an embodiment, all utterances in the training data of words not belonging to the first set of target words are excluded from the first training stage.

At 430, the processor may generate a second training model by performing a second training stage by predicting a second set of target words based on the first training model.

Accordingly, by first ensuring a good convergence point for predicting more frequently occurring words in a first training stage, and then using the learned representation from the earlier stage to help predicting the words with fewer examples in a second training stage, the operations of the curriculum training unit 112 improves over the conventional A2W training systems.

Next, a joint CTC-CE training unit 113 is described herein according to an embodiment. For instance, Cross Entropy (CE) and CTC are two different loss functions for training speech recognition systems. The CE loss is used in related art speech recognition systems where a fixed alignment between acoustic frames and labels is needed. On the other hand, CTC loss is used in related art end-to-end speech recognition systems, where the loss is computed from all alignment paths belong to given target label sequence.

Figure 5:
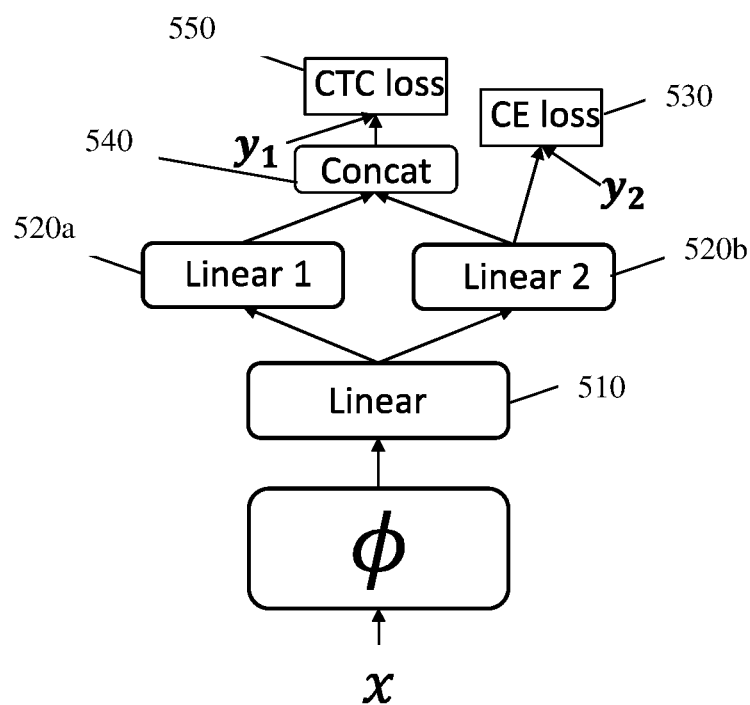
FIG. 5 is a diagram illustrating joint CTC-CE training according to an embodiment.

FIG. 5 illustrates a joint CTC-CE training unit 113 according to an embodiment. In the joint CTC-CE network framework, the final projection layer in baseline A2W model is extended with two linear transformation layers, where a CE loss updating is performed on only one of the two linear layers. For instance, in the joint CTC-CE network framework, the final projection layer may be a linear layer extended with a first linear layer and second linear layer. Accordingly, by having two linear transform layers, one linear layer dedicated to CTC objectives is preserved.

Figure 6A:
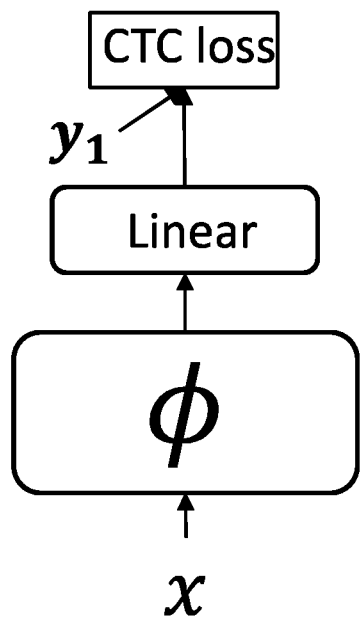
FIGS. 6A and 6B is a diagram illustrating related training systems.
Figure 6B:
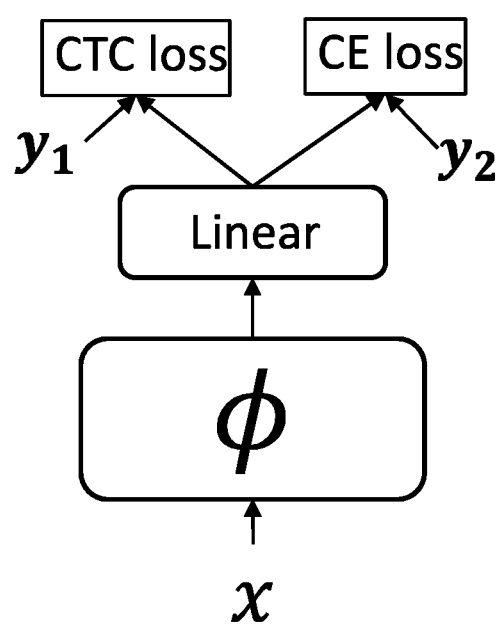

Specifically, according to an embodiment, the bottom CNN and BLSTM layers may be the same as in related training systems illustrated in FIGS. 6A (vanilla CTC) and 6B (multi-task learning). However, as illustrated in FIG. 5, the output of top linear projection layer 510 is further projected with two separate linear projection layers (520a and 520b) to include the CE loss into CTC based A2W speech recognition system. The output from the second linear layer 520b is directly connected to the final output layer 530 of CE model to receive error signals from CE loss. At the same time, the hidden activations of both projection layers 520a and 520b are concatenated at 540 to obtain the final output distribution 550 for computing the CTC loss.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor, hardware circuitry or any other device capable of responding to and executing instructions in a defined manner. The processing device also may access, store, manipulate, process, and create data in response to execution of the software.

The software may include a computer program, a piece of code, an instruction, or some combination thereof, to independently or collectively instruct or configure the processing device to operate as desired. The method according to the above-described example embodiments may be recorded in non-transitory computer-readable media including program instructions to implement various operations of the above-described example embodiments. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like.

Experimental Results

The A2W speech recognition system 100 according to an embodiment significantly improves speech recognition performance in terms of word error rate (WER) compared to related art A2W systems as shown in the comparison table 1 below. For instance, in table 1, the last row is the A2W system trained with new training strategy which significantly outperformed other end-to-end systems.

| Model | Output Unit | LM/ Decoder | SWB | CH |
| --- | --- | --- | --- | --- |
| Attention Seq2seq [21] | char | Y | 25.8 | 36.0 |
| CTC + CharLM [22] | char | Y | 21.4 | 40.2 |
| Iterated CTC [5] | char | Y | 15.1 | 26.3 |
| CTC [23] | char | Y | 14.5 | — |
| A2W [13] | word | N | 14.6 | 23.6 |
| A2W (this work) | word | Y | 11.4 | 20.8 |

The present disclosure has been described above with reference to embodiments. However, those of ordinary skill in the art will understand that various changes in form and details may be made therein without departing from the spirit and scope of the present disclosure as defined by the appended claims. Therefore, the above embodiments should be considered in descriptive sense only and not for purposes of limitation. Thus, the scope of the present disclosure may be defined not by the above detailed descriptions but by the appended claims, and all differences within the scope will be construed as being included in the present disclosure.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A method of performing acoustic to word (A2W) speech recognition training performed by at least one processor, the method comprising:
    initializing, by the at least one processor, one or more first layers of a neural network with phone based Connectionist Temporal Classification (CTC);
    initializing, by the at least one processor, one or more second layers of the neural network with grapheme based CTC;
    acquiring, by the at least one processor, training data; and
    performing, by the at least one processor, A2W speech recognition training based the initialized one or more first layers and one or more second layers of the neural network using the training data,
    wherein the one or more first layers with the phone based CTC is a lower layer, which is initialized prior to the one or more second layers with the graphene based CTC, which is an upper layer provided after the lower layer.

2. The method of claim 1, wherein the one or more first layers of the neural network are lower layers of the neural network that are closer to an input of the training data.

3. The method of claim 2, wherein the one or more second layers of the neural network are stacked above one or more first layers of the neural network.

4. The method of claim 1, wherein the one or more first layers of the neural network comprises at least one of a Convolutional Neural Network (CNN) layer and a Bi-directional Long Short-Term Memory (BLSTM) layer.

5. The method of claim 1, wherein the performing the A2W speech recognition training comprises:
    generating a first training model by performing a first training stage by predicting only a first set of target words; and
    generating a second training model by performing a second training stage by predicting a second set of target of words based on the first training model.

6. The method of claim 5, wherein all utterances in the training data of words not belonging to the first set of target words are excluded from the first training stage.

7. The method of claim 1, wherein the one or more second layers comprises a first linear projection layer, and
    wherein the performing the A2W speech recognition training comprises: projecting an output of the first linear projection layer with a second linear projection layer and a third linear projection layer.

8. The method of claim 7, wherein output from the second linear layer is directly connected to a final output layer of a CE model to receive error signals from CE loss, and
    wherein both the output from the second linear layer and output from the third linear layer are concatenated to obtain a final output distribution for computing CTC loss.

9. An acoustic to word (A2W) speech recognition training apparatus comprising:
    at least one memory operable to store program code; and
    at least one processor operable to read said program code and operate as instructed by said program code, said program code comprising:
        a first initialization code configured to initialize one or more first layers of a neural network with phone based Connectionist Temporal Classification (CTC);
        a second initialization code configured to initialize one or more second layers of the neural network with grapheme based CTC;
        an acquiring code configured to acquire training data; and
        a training code configured to perform A2W speech recognition training based the initialized one or more first layers and one or more second layers of the neural network using the training data,
        wherein the one or more first layers with the phone based CTC is a lower layer, which is initialized prior to the one or more second layers with the graphene based CTC, which is an upper layer provided after the lower layer.

10. The A2W speech recognition training apparatus of claim 9, wherein the one or more first layers of the neural network are lower layers of the neural network that are closer to an input of the training data.

11. The A2W speech recognition training apparatus of claim 10, wherein the one or more second layers of the neural network are stacked above one or more first layers of the neural network.

12. The A2W speech recognition training apparatus of claim 9, wherein the one or more first layers of the neural network comprises at least one of a Convolutional Neural Network (CNN) layer and a Bi-directional Long Short-Term Memory (BLSTM) layer.

13. The A2W speech recognition training apparatus of claim 9, wherein the performing the A2W speech recognition training comprises:
    generating a first training model by performing a first training stage by predicting only a first set of target words; and
    generating a second training model by performing a second training stage by predicting a second set of target words based on the first training model.

14. The A2W speech recognition training apparatus of claim 13, wherein all utterances in the training data of words not belonging to the first set of target words are excluded from the first training stage.

15. The A2W speech recognition training apparatus of claim 9, wherein the one or more second layers comprises a first linear projection layer, and
    wherein the performing the A2W speech recognition training comprises: projecting an output of the first linear projection layer with a second linear projection layer and a third linear projection layer.

16. The A2W speech recognition training apparatus of claim 15, wherein output from the second linear layer is directly connected to a final output layer of a CE model to receive error signals from CE loss, and
    wherein both the output from the second linear layer and output from the third linear layer are concatenated to obtain a final output distribution for computing CTC loss.

17. A non-transitory computer readable medium having stored thereon program code for performing an acoustic to word (A2W) speech recognition training, said program code comprising:

a first initialization code configured to initialize one or more first layers of a neural network with phone based Connectionist Temporal Classification (CTC);

a second initialization code configured to initialize one or more second layers of the neural network with grapheme based CTC;

an acquiring code configured to acquire training data; and a training code configured to perform A2W speech recognition training based the initialized one or more first layers and one or more second layers of the neural network using the training data, wherein the one or more first layers with the phone based CTC is a lower layer, which is initialized prior to the one or more second layers with the graphene based CTC, which is an upper layer provided after the lower layer.

18. The non-transitory computer readable medium according to claim 17, wherein the training code to perform A2W speech recognition training comprises:

a first generating code configured to generate a first training model by performing a first training stage by predicting only a first set of target words; and a first generating code configured to generate a second training model by performing a second training stage by predicting a second set of target words based on the first training model.

\* \* \* \* \*